(12) United States Patent
Hashimoto et al.

(10) Patent No.: US 7,182,470 B2
(45) Date of Patent: Feb. 27, 2007

(54) LIGHT AMOUNT CONTROL APPARATUS AND PROJECTOR APPARATUS USING THE SAME

(75) Inventors: Kenitiro Hashimoto, Yamanashi-ken (JP); Yukihiko Hayakawa, Kofu (JP)

(73) Assignee: Nisca Corporation, Yamanashi-Ken (JP)

( * ) Notice: Subject to any disclaimer, the term of this patent is extended or adjusted under 35 U.S.C. 154(b) by 141 days.

(21) Appl. No.: 11/082,818

(22) Filed: Mar. 18, 2005

(65) Prior Publication Data

US 2006/0050249 A1    Mar. 9, 2006

(30) Foreign Application Priority Data

| Sep. 9, 2004 | (JP) | ............................. 2004-262691 |
| Sep. 9, 2004 | (JP) | ............................. 2004-262692 |
| Sep. 9, 2004 | (JP) | ............................. 2004-262693 |
| Sep. 9, 2004 | (JP) | ............................. 2004-262694 |

(51) Int. Cl.
 *G03B 21/14* (2006.01)
(52) U.S. Cl. .................. 353/97; 362/283; 362/322; 359/236
(58) Field of Classification Search ............... 353/97; 349/5, 7, 8, 9; 362/283, 284, 321, 322, 323, 362/324; 359/233, 234, 236
See application file for complete search history.

(56) References Cited

U.S. PATENT DOCUMENTS

| 6,755,538 | B2 * | 6/2004 | Sugawara ..................... 353/97 |
| 6,769,777 | B1 * | 8/2004 | Dubin et al. .................. 353/97 |
| 6,854,851 | B2 * | 2/2005 | Yamasaki et al. ............. 353/97 |
| 2002/0109992 | A1 * | 8/2002 | Wang ......................... 362/293 |
| 2006/0050248 | A1 * | 3/2006 | Koga et al. ................... 353/97 |

FOREIGN PATENT DOCUMENTS

| JP | 2000-28988 | 1/2000 |
| JP | 2003-121938 | 4/2003 |

* cited by examiner

*Primary Examiner*—William C. Dowling
(74) *Attorney, Agent, or Firm*—Manabu Kanesaka

(57) ABSTRACT

A light amount control apparatus includes a pair of light amount control plates arranged at side edge portions of a light path, a driving device having a drive rotating shaft, and a transmitting member for transmitting rotation of the drive rotating shaft to the light amount control plates. The light amount control plates are supported by the rotating support shafts at two side edges of the light path to pivot in an advancing direction of the light path. The drive rotating shaft is arranged substantially parallel to the rotating support shafts. A transmitting member includes a first gear assembly connected to the drive rotating shaft, and a second gear assembly rotated in a direction reverse thereto. One light amount control plate is fixedly supported by the first gear assembly, and the other light amount control plate is fixedly supported by the second gear assembly.

12 Claims, 14 Drawing Sheets

LIGHT AMOUNT CONTROL APPARATUS AND PROJECTOR APPARATUS USING THE SAME

BACKGROUND OF THE INVENTION AND RELATED ART STATEMENT

The present relates to a light amount control apparatus for controlling a light amount in projecting an image formed by image forming device of a liquid crystal panel or the like onto a screen with a projecting lens, and a projector apparatus using the same.

Generally, an apparatus for projecting a light image of a liquid crystal projector apparatus or the like onto a screen is widely used as an apparatus connected to an image apparatus of a computer, a television set, or the like for projecting an image outputted from the image apparatus onto a screen with a projecting lens.

A light image projected by such a projector apparatus is felt to be dazzling or dark depending on an environment where the apparatus is used. The reason is that, for example, in a state in which a pupil of a person using the apparatus at a dark place is opened, when a bright image is constituted abruptly, light is felt more strongly than actual light. Conversely, at a bright place, the screen is felt to be dark and therefore, an easiness to see depending on a surrounding brightness causes a problem. Further, there also causes a problem that even by an image viewed as in a flash image, an unpleasant feeling is felt by extremely stimulating a nerve of a person enjoying the image by changing the brightness of the image in an extremely short period of time though the nerve is stimulated temporarily.

It is necessary to control a brightness of an image projected to a screen in accordance with a surrounding environment or a viewing environment. In a related art, as a method of controlling the projected light amount, there is known a method of controlling a light source of irradiating light to a liquid crystal panel or the like, or controlling a voltage applied to the liquid crystal panel in, for example, Patent Reference 1 (Japanese Patent Publication (Kokai) No. 2000-28988)

In a related art, as a method of controlling the projected light amount (brightness of screen image), a method of controlling a voltage applied to a liquid crystal panel is known. However, a liquid crystal panel has a particular relationship between a voltage and a transmittance, and there poses a problem that in changing a brightness by changing the voltage, it is difficult to control the voltage such that red, blue, and green are uniformly changed, further, in controlling the brightness, also a tone of color is changed.

It is proposed in, for example, Patent Reference 2 (Japanese Patent Publication (Kokai) No. 2003-121938) to control a brightness of a screen image constant by controlling a light amount projected by a projecting lens by a light shielding mask plate. The reference discloses a constitution for providing a base member having a projecting hole (lens hole) in a direction orthogonal to a projecting light path of a projecting lens at a front face thereof and attaching a light shielding plate (mask member) for controlling an aperture of the projecting hole to be large or small at the base member opening and closing in the direction orthogonal to the light path to control a light amount. Therefore, by controlling an interval in irradiating an image formed at a liquid crystal panel onto a screen by a projecting lens by receiving light from a light source by controlling an opening of a light path to be large or small by a light shielding plate provided at a plane orthogonal to the projecting light path, a brightness of an image on the screen is controlled.

In controlling the light amount of the light path projected by the projecting lens as described above by the light shielding plate (mask member), when the light amount is intended to control by sliding to move the light shielding plate provided at the plane orthogonal to the projecting light path as disclosed in Patent Reference 2, a space for moving forward and rearward a light shielding member (mask plate in a blade-like shape or the like) and a space of arranging a drive mechanism for opening and closing the light shielding member are needed at a side portion of the projecting lens. The spaces become at least double of an area of the light shielding member. On the other hand, the projecting lens is normally constituted by a circular shape and integrated to a lens-barrel portion in a cylindrical shape. Accordingly, the light amount control apparatus is projected in a side direction of the lens. Therefore, an undesirable result for small-sized formation or space saving formation of the apparatus is brought about.

In order to resolve such a problem, the inventors have tried to achieve space saving formation and small-sized formation of an apparatus in comparison with those in the case of constituting the light shielding plate to be able to move forward and rearward in the plane orthogonal to the light path by providing a pair of light shielding plates (plate members) on the left and on the right of a light path of projecting onto a screen by a projecting lens and controlling an amount of opening the light path by pivoting the light shielding plates in a direction of advancing the light path.

However, there poses a problem that by adopting such a constitution, a center of a projecting light amount is shifted unless the pair of the shielding plates is moved to open and close by the same amount in synchronism with each other, and there poses a problem that depending on arrangement of a drive apparatus of a drive motor or the like relative to rotating shafts for supporting the light shielding plates, the apparatus is significantly projected in a side direction of the projecting light path similar to the related art. Accordingly, a mechanism in opening and closing the pair of light shielding plates by a drive apparatus of a motor or the like has a significant influence on a compactness of the apparatus.

In view of the problems described above, it is an object of the invention to provide a light amount control apparatus capable of achieving a small-sized compact formation of the apparatus by compactly arranging a mechanism for controlling a light amount of a projecting light path at a peripheral edge of the light path and firmly controlling the light amount and a projector apparatus using the same.

Further objects and advantages of the invention will be apparent from the following description of the invention.

SUMMARY OF THE INVENTION

According to a first aspect of the invention, a light amount control apparatus comprises a pair of light amount control plates arranged at side edge portions of a light path for projecting light of a light source opposed to each other; a driving device having a drive rotating shaft; and a transmitting member for transmitting rotation of the drive rotating shaft to the light amount control plates. The pair of the light amount control plates is supported by centering on a pair of rotating support shafts arranged substantially in parallel with each other at two side edges of the light path to pivot in an advancing direction of the light path. The drive rotating shaft is arranged substantially in parallel with the rotating support shafts. The transmitting member comprises a first gear assembly arranged in a direction substantially orthogonal to the drive rotating shaft and connected to the drive rotating shaft to rotate, and a second gear assembly moving in cooperation with the first gear assembly and rotating in a direction reverse thereto. One of the pair of the light amount control plates is fixedly supported by the first gear assembly, and the other of the pair of the light amount control plates is fixedly supported by the second gear assembly, respectively.

The pair of the rotating support shafts and the drive rotating shaft is arranged substantially in parallel with each other at left and right side edges opposed to each other by interposing the light path. The pair of the light amount control plates and a drive apparatus of a motor or the like are compactly integrated in a side direction of the light path, and the above-described problems can be resolved.

According to a second aspect of the invention, in the constitution of the first aspect, the transmitting member is provided to transmit the rotation in a direction substantially orthogonal to the pair of the rotating support shafts by connecting the first gear assembly to the drive rotating shaft to be driven via a timing belt and rotating the second gear assembly by rotating the first gear assembly. The pair of the light amount control plates is rotated respectively by a constant amount by moving to rotate the transmitting member by the drive rotating shaft. Thereby, the transmitting member is arranged at a peripheral edge of a lower portion or an upper portion of the light path, and the driving movement is transmitted to the pair of the rotating support shafts by moving the transmitting member, thereby making the transmitting mechanism simple.

According to a third aspect of the invention, in one of the constitutions of the first and the second aspects, the one of the pair of the light amount control plates is attached to the first gear assembly, and the other of the pair of the light amount control plates is attached to the second gear assembly, respectively, at positions spaced apart from rotational centers of the first gear assembly and the second gear assembly by predetermined distances. The pair of the light amount control plates is pivoted respectively by a predetermined angle between an operating position of advancing into the light path and an escaping position escaped from the light path. Thereby, a light amount can be controlled by pertinently moving the light amount control plates between the operating position of advancing into the light path and the escaping position of escaping from the light path.

According to a fourth aspect of the invention, in the constitution of the first aspect, the first gear assembly includes one spur gear. The second gear assembly comprises two spur gears rotatably supported on a same axis and brought in mesh with the spur gear of the first gear assembly. The two spur gears are urged in a direction of pulling each other in a rotational direction thereof. Teeth of the spur gears are held at positions shifted from each other, and teeth of the spur gear of the first gear assembly are brought in mesh with between the shifted teeth of the two spur gears of the second gear assembly. By adopting a drive connecting structure of bringing the teeth of the spur gear of the first gear assembly in mesh with between the teeth of the two spur gears of the second gear assembly shifted from each other, the backlash can be removed, thereby improving positional accuracy of the light amount control plates and preventing the light amount from dispersing.

According to a fifth aspect of the invention, in one of the constitutions of the first through the fourth aspects, respective pairs of the light amount control plates are provided at left and right side edge portions and upper and lower side edge portions of the light path opposed to each other, and the respective light amount control plates are pivotally supported by the rotating support shafts in the advancing direction of the light path. Therefore, the pairs of the light amount control plates are arranged on left and right sides and upper and lower sides of the light path, and the light amount is controlled to be large or small by a relationship substantially uniform in the left and right directions and the upper and lower directions relative to the center of the light path.

In the light amount control apparatus of the invention, the first gear assembly includes a spur gear connected to the drive rotating shaft to rotate. The second gear assembly includes a pair of spur gears supported pivotally on a same axis and urged in a direction of pulling each other in a rotational direction. Teeth of the spur gear are brought in mesh with between teeth of the pair of the spur gears shifted from each other. Thereby, the pair of the rotating support shafts and the drive rotating shaft is respectively arranged substantially in parallel with each other at the left and right side edges opposed to each other by interposing the light path. The light amount control plates and the drive apparatus of a motor or the like are compactly integrated without being projected in a side direction of the light path, and the above-described problem can be resolved.

Further, an urging device is interposed between the pair of the spur gears for urging the pair of the spur gears in a direction of pulling each other. The urging device comprises a tension spring expanded between the pair of the spur gears.

In the above-described light amount control apparatus, vicinities of side ends of the pair of the light amount control plates on sides of the light source can be rotated around the pair of the rotating support shafts in an escaping state of escaping from the light path. The side edges are folded to bend to outer sides from a center of the light path by substantially a right angle or larger. Thereby, the pair of the rotating support shafts and the drive rotating shaft is respectively arranged substantially in parallel with each other at the left and right side edges opposed to each other by interposing the light path. The light amount control plates and the drive apparatus of a motor or the like are compactly integrated without being projected in the side direction of the light path, and the above-described problem can be resolved.

According to a sixth aspect of the invention, a projector apparatus comprises an image forming device for forming an image; a projecting light path for projecting light from a light source to irradiate to the image forming device; a pair of light amount control plates arranged at side edge portions of the projecting light path opposed to each other; and a driving device having drive rotating shafts for driving to open and close the light amount control plates. The pair of the light amount control plates is supported by centering on a pair of rotating support shafts-arranged substantially in parallel with each other at two side edges of the light path to pivot in an advancing direction of the light path. The drive rotating shaft is arranged substantially in parallel with the rotating support shafts. The transmitting member comprises a first gear assembly arranged in a direction substantially orthogonal to the drive rotating shaft and connected to the drive rotating shaft to rotate, and a second gear assembly moving in cooperation with the first gear assembly and rotating in a direction reverse thereto. One of the pair of the light amount control plates is fixedly supported by the first gear assembly, and the other of the pair of the light amount control plates is fixedly supported by the second gear assembly, respectively. Thereby, the small-sized and compact projector apparatus can be provided.

In the above-described projector apparatus of the invention, the first gear assembly includes a spur gear connected to the drive rotating shaft to rotate. The second gear assembly includes a pair of spur gears pivotally supported on a same axis and urged in a direction of pulling each other in a rotational direction. Teeth of the spur gear are brought in mesh with between teeth of the pair of spur gears shifted from each other. Thereby, the pair of the rotating support shafts and the drive rotating shaft is respectively arranged substantially in parallel with each other at the left and right side edges opposed to each other by interposing the light path. The light amount control plates and the drive apparatus of a motor or the like are compactly integrated without being projected in the side direction of the light path, and the above-described problem can be resolved.

Further, in the above-described projector of the invention, vicinities of side edges of the pair of the light amount control plates on sides of the light source can be rotated centering on the pair of the rotating support shafts in an escaping state of escaping from the light path. The side edges are folded to bend to outer sides from a center of the light path by substantially a right angle or larger. Thereby, the pair of the rotating support shafts and the drive rotating shaft is respectively arranged substantially in parallel with each other at the left and right side edges opposed to each other by interposing the light path. The light amount control plates and the drive apparatus of a motor or the like are compactly integrated without being projected in the side direction of the light path, and the above-described problem can be resolved.

Further, in the projector apparatus of the invention, the light amount control apparatus is attached to a main body of the projector apparatus by being inclined relative to front and rear directions in the advancing direction of the projecting light path. The pair of the light amount control plates is respectively pivoted by a predetermined angle between an operating position of advancing into the light path and an escaping position of escaping from the light path relative to the front and rear directions in the advancing direction of the projecting light path.

BRIEF DESCRIPTION OF THE DRAWING

FIGS. 13(a) to 13(c) are explanatory views showing a mode of a light amount control plate different from that of the apparatus shown in FIG. 4 through FIG. 9, wherein FIG. 13(a) shows a state that the light amount control plate is disposed at an escaping position, FIG. 13(b) shows a state that the light amount control plate is moved from the escaping portion to a contracting position, and FIG. 13(c) shows a state that the light amount control plate is disposed at the contracting position.

DETAILED DESCRIPTION OF PREFERRED EMBODIMENTS

Hereunder, embodiments of the invention will be explained with reference to the drawings.

Figure 1:
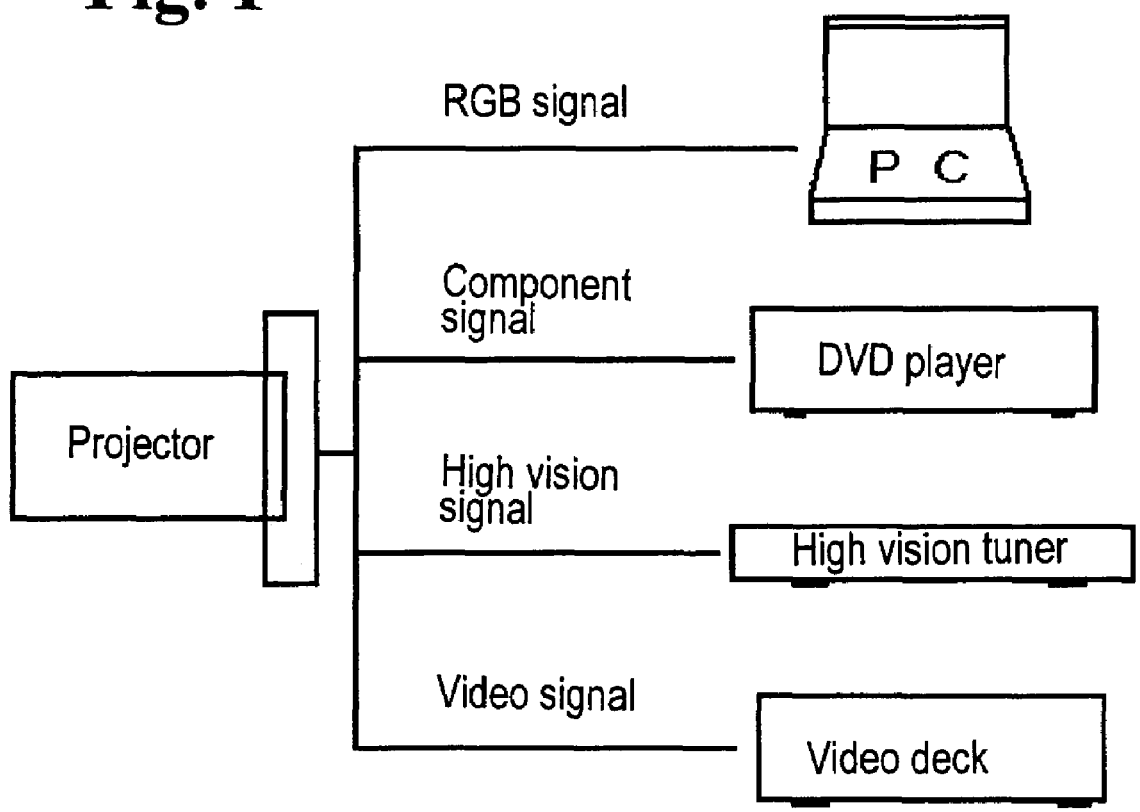
FIG. 1 is an explanatory view showing a system constitution of a projector apparatus according to an embodiment of the invention.
Figure 2:
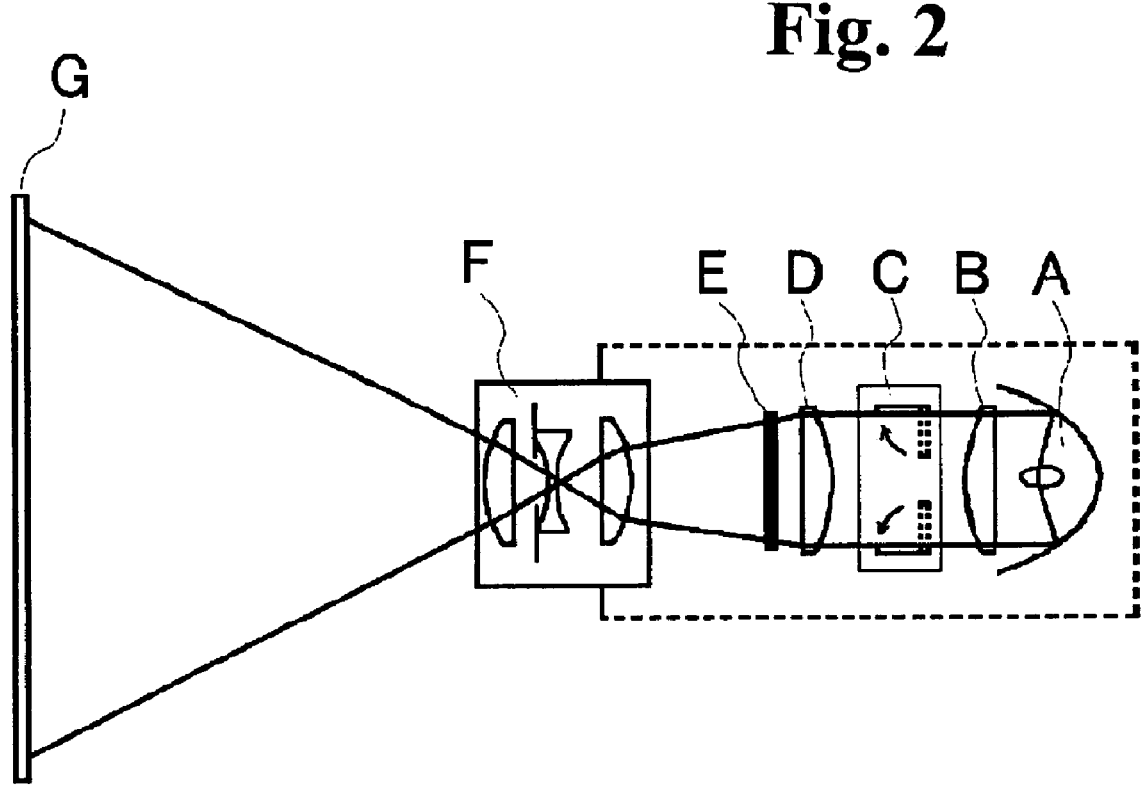
FIG. 2 is an explanatory view of a layout of the projector apparatus according to the embodiment of the invention.
Figure 3A:
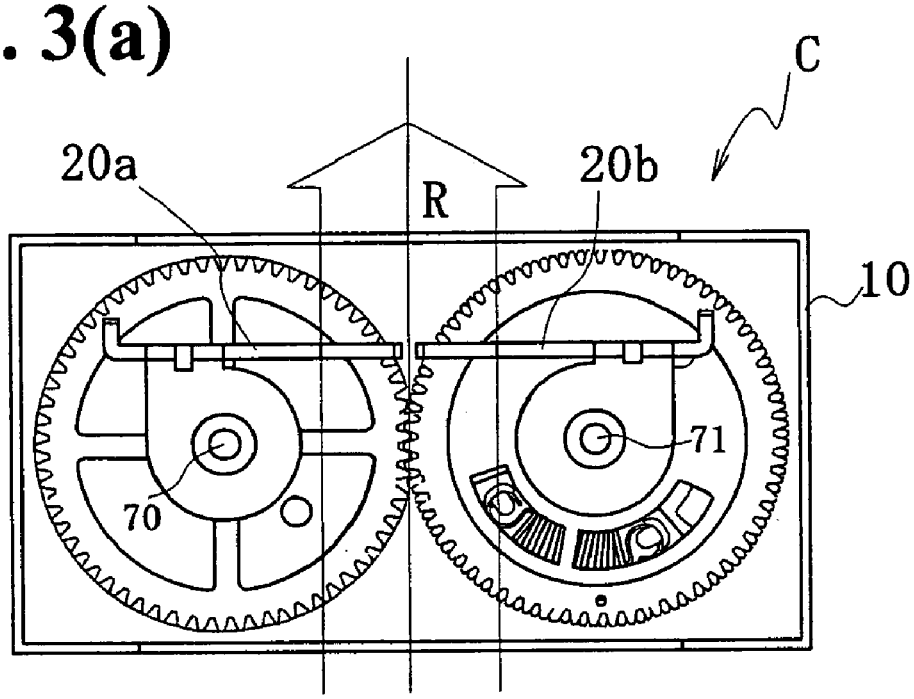
FIGS. 3(a) and 3(b) are explanatory views of an operational principle of a light amount control apparatus according to the invention.
Figure 3B:
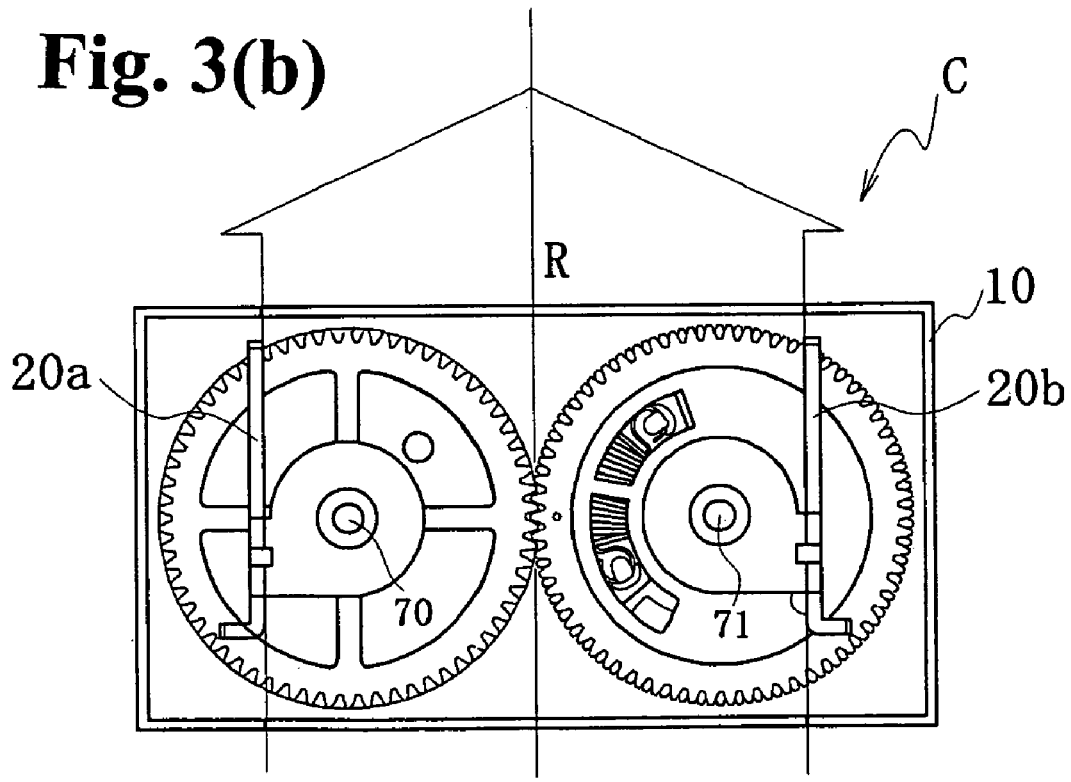
Figure 9:
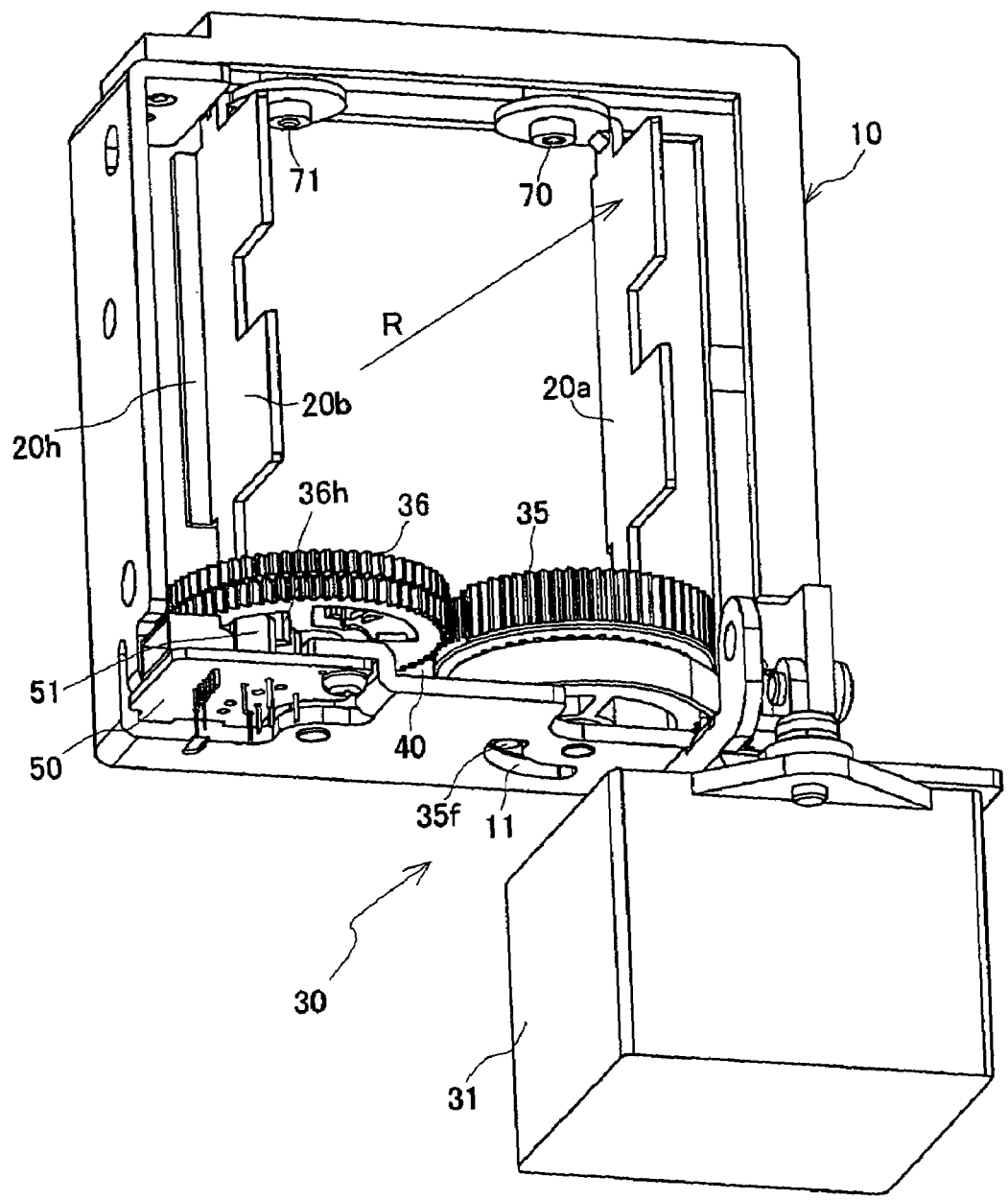
FIG. 9 is a perspective view of the apparatus shown in FIG. 7 viewed from below.
Figure 10:
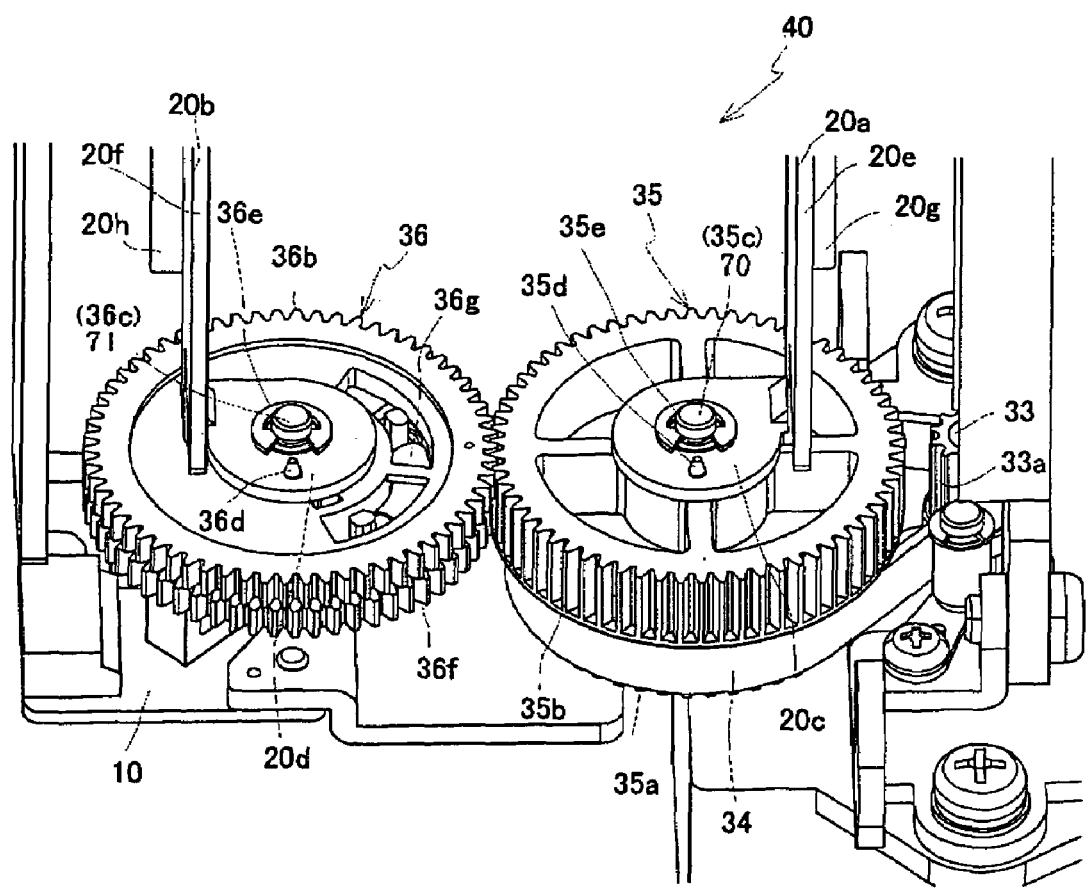
FIG. 10 is an enlarged perspective view showing a drive transmitting system of the light amount control apparatus according to the invention.
Figure 11:
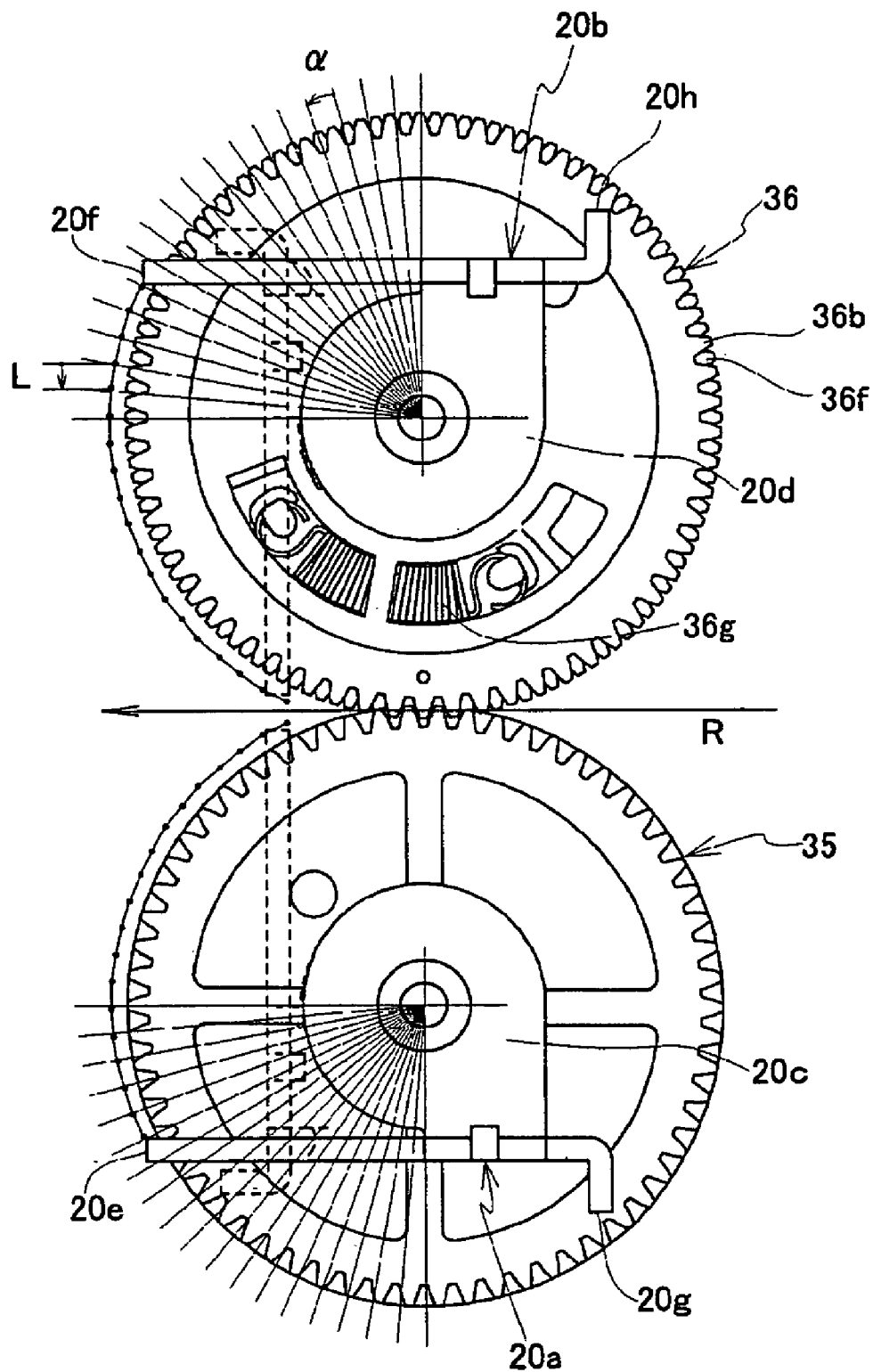
FIG. 11 is an explanatory view of an operation showing a movement locus of a light amount control plate of the light amount control apparatus according to the invention.
Figure 12:
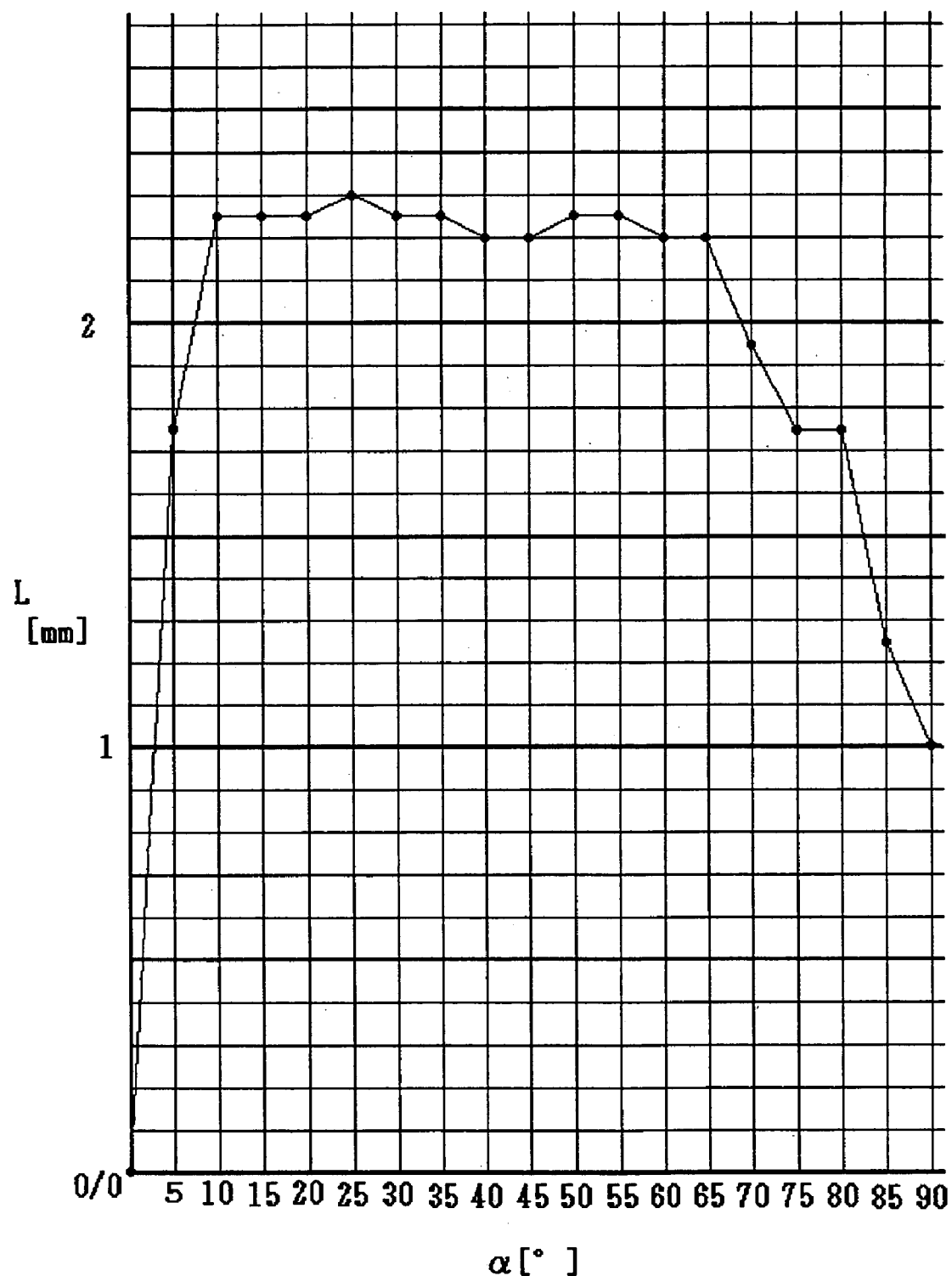
FIG. 12 is an explanatory chart showing a characteristic of driving the light amount control plate of the light amount control apparatus according to the invention.
Figure 13A:
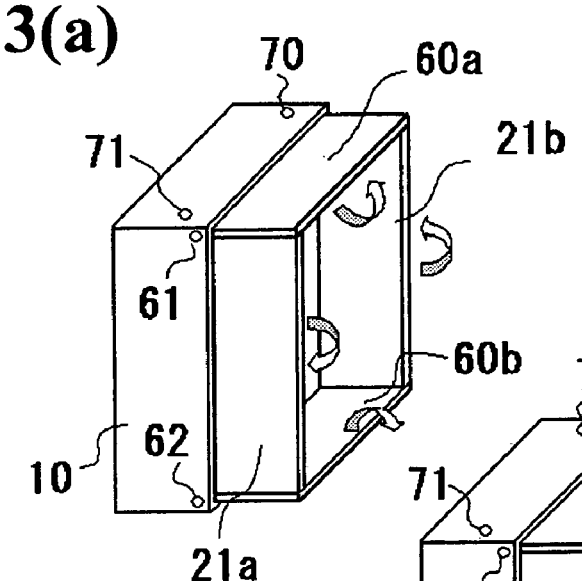
Figure 13B:
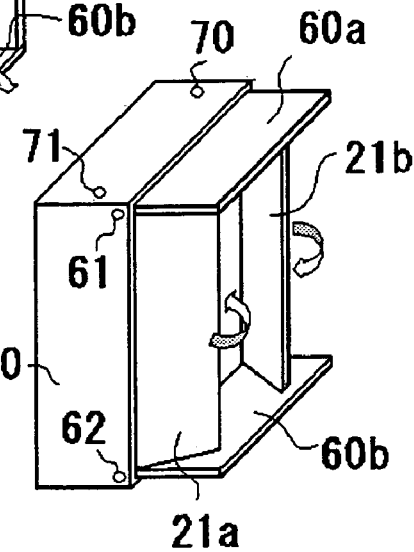
Figure 13C:
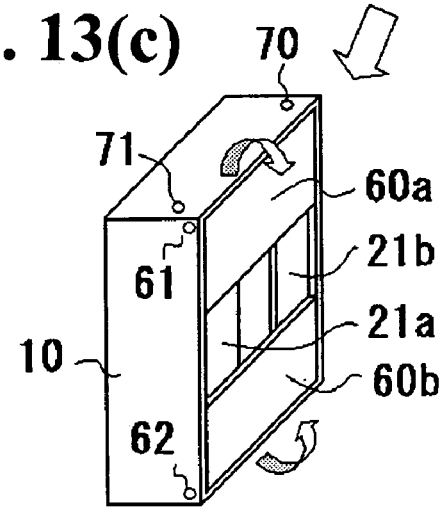
Figure 14:
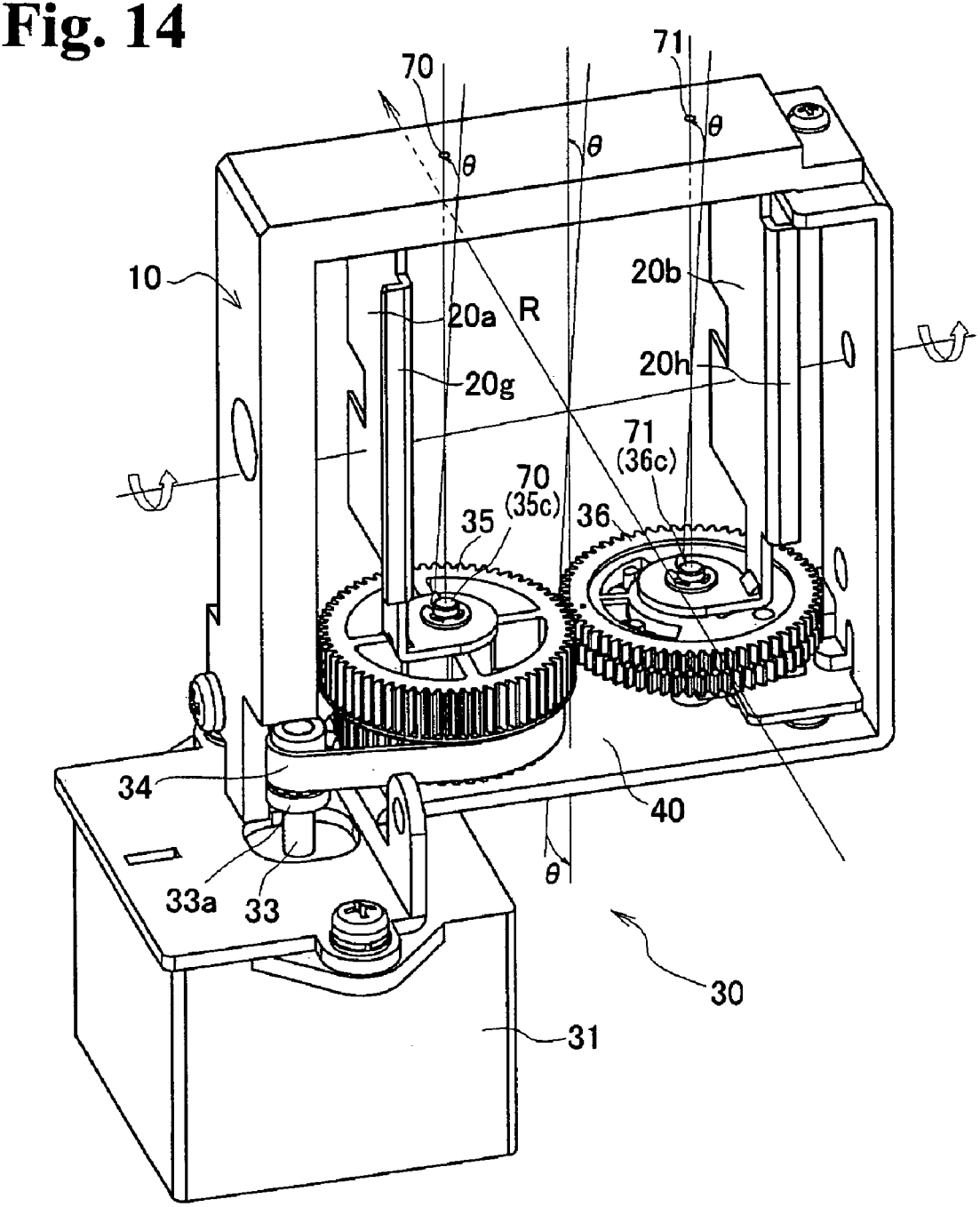
FIG. 14 is an explanatory view for explaining a process of attaching the light amount control apparatus to a main body of the projector apparatus.

FIG. 1 is an explanatory view showing a system constitution of a projector apparatus using the invention, FIG. 2 is a view of an outline constitution of the projector apparatus, FIGS. 3(a) and 3(b) are explanatory views of a light amount control apparatus for controlling a projecting light amount of the projector apparatus, FIG. 4 through FIG. 9 are explanatory views for explaining a total constitution of the light amount control apparatus, FIG. 10 is an enlarged perspective view showing a drive transmitting system of the light amount control apparatus, FIG. 11 is an explanatory view of operation showing a movement locus of a light amount control plate in the light amount control apparatus, FIG. 12 is an explanatory view showing a characteristic of driving the light amount control plate in the light amount control apparatus, FIGS. 13(a) to 13(c) are explanatory views showing a mode of a light amount control plate different from that of the light amount control apparatus of FIG. 4 through FIG. 9 wherein FIG. 13(a) is a state when the light amount control plate is disposed at an escaping position, FIG. 13(b) is a state when the light amount control plate is moved from the escaping position to a contracting position, and FIG. 13(c) is a state when the light amount control plate is disposed at the contracting position, and FIG. 14 is an explanatory view for explaining a method of attaching the light amount control apparatus according to the invention to a main body of the projector apparatus.

First, in FIG. 1, as methods of inputting an image to a projector apparatus, there are methods by an RGB signal, a component signal, a high vision signal, and a video signal. The RGB signal is used when the signal is transmitted from an image output terminal of, for example, a computer to the projector apparatus. In using the component signal, an output terminal of a DVD player and the projector apparatus are connected. In using the high vision signal, an output terminal of a tuner of a high vision television set and the projector apparatus are connected. In using the video signal, an output terminal of a video deck and the projector apparatus are connected. Further, although various kinds of the projector apparatus are known, as an example thereof, FIG.

2 shows a layout constitution when a liquid crystal panel is used as an image forming portion (image forming device).

As shown in FIG. 2, the projector apparatus is constituted by a light source A, a condenser lens B for converting light from the light source A into parallel ray, an illuminating optical system D including a dichroic mirror for separating color of light of the lens B, a liquid crystal panel E for receiving light from the illuminating optical system D, and a projecting lens F for projecting light passing the liquid crystal panel E. Various methods are known for the projecting optical system, and the projector apparatus is constituted by integrating a light source portion (light source A or the like), an image forming portion (liquid crystal panel E or the like) and a projecting portion (projecting lens F or the like) in a casing by a pertinent constitution.

A light amount control apparatus C included in the projector apparatus is integrated between, for example, the condenser lens B and the illuminating optical system D as the following structure.

As shown in FIG. 4 through FIG. 9, the light amount control apparatus C is constituted as a unit by integrating a light amount control plate 20, a drive apparatus 30, and a transmitting mechanism 40 with a frame 10 surrounding a light path R of the projector apparatus.

The frame 10 is formed in a shape of integrating to the projector apparatus by a pertinent resin material and is provided with an opening of the light path R. A peripheral side edge of the opening is arranged with a pair of light amount control plates 20a, 20b at left and right side edges thereof opposed to each other to form an opening diameter of the opening. The light amount control plates 20a, 20b are formed by punching a thin plate of a metal plate (for example, SUS304 material, a plate thickness of 1.0 mm) capable of withstanding a high temperature equal to or higher than 100 degrees without being subjected to a surface treatment to reflect illuminating heat as much as possible. Shapes of the light amount control plates 20a, 20b are formed to provide the opening substantially uniform from a center of the light path R to left and right sides and upper and lower sides.

That is, the center of the light path R is derived from centers of the condenser lens B and the projecting lens F, and the shapes of the light amount control plates 20a, 20b are determined to form substantially the uniform opening to the left and right sides and the upper and lower sides relative to the center of the optical path R. The shapes may pertinently be set, and since an image to be projected is constituted by a rectangular shape, the shapes of the light amount control plates 20a, 20b are also formed in the rectangular shape as illustrated. Further, the pair of left and right light amount control plates 20a, 20b is supported by rotating support shafts 70, 71 comprising projected pins provided by being integrally formed with the frame 10. In this case, the light amount control plates 20a, 20b are respectively formed with bearing holes for fitting the respective projected pins of the rotating support shafts 70, 71, and the both members are fitted pivotally by bearings.

As shown in FIGS. 3(a) and 3(b), the pair of left and right light amount control plates 20a, 20b is opened and closed in a biparting shape by being pivoted centering on the rotating support shafts 70, 71 in an arrow mark direction penetrating the center (advancing direction of the light path), and regulated to open and close to dispose at a position pertinent for providing a desired light amount between an operating position shown in FIG. 3(a) at which the light amount control plates are mostly closed and an escaping position shown in FIG. 3(b) at which the light amount control plates are escaped to outside of the light path.

Figure 4:
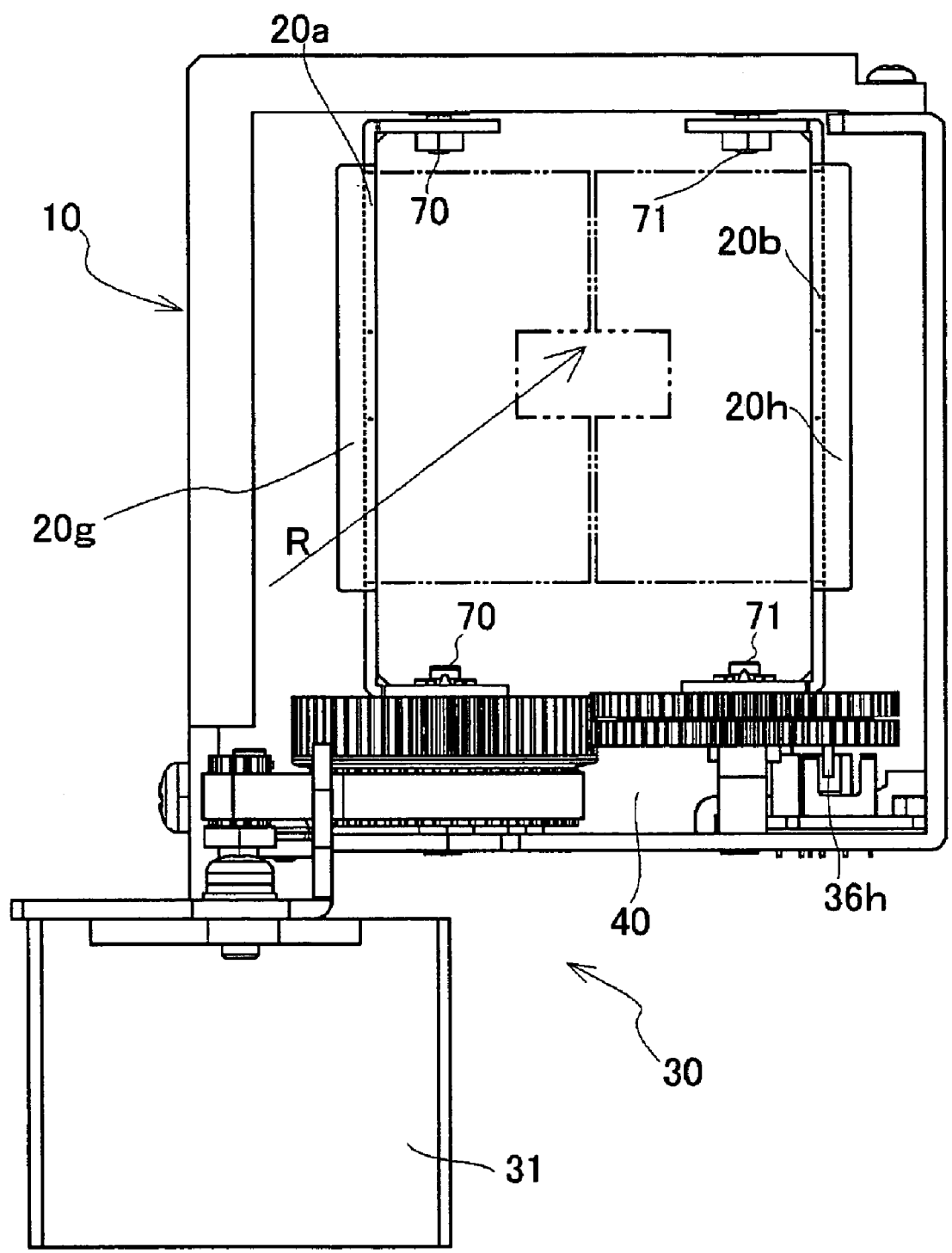
FIG. 4 is a front view of the light amount control apparatus according to the invention.

As shown in FIG. 4, the rotating support shafts 70, 71 constituted by the projected pins are arranged in parallel with peripheral side edges of the light path. R opposed to each other, and the shapes and opening and closing operation of the light amount control plates 20a, 20b are formed symmetrically in the left and right direction. Although the rotating support shafts 70, 71 are integrally formed with the frame 10, the rotating support shafts 70, 71 may be integrally formed with the pair of left and right light amount control plates 20a, 20b by switching bearing holes of counterparts of fitting.

The frame 10 is attached with a drive motor 31, and a drive rotating shaft 33 thereof is disposed substantially in parallel with the rotating support shafts 70, 71 constituting rotational centers of the light amount control plates 20a, 20b. Therefore, the rotating support shafts 70, 71 pivotally supporting the light amount control plates 20a, 20b are arranged in parallel at two left and right side portions relative to an optical axis center of the light path R, and the drive motor 31 is arranged such that the drive rotating shaft 33 becomes in parallel with the two support shafts 70, 71. The illustrated drive motor 31 is constituted by a stepping motor.

The pair of left and right rotating support shafts 70, 71 and the drive rotating shaft 33 are arranged in parallel with each other by being spaced apart from each other at distances therebetween in a plane orthogonal to the light path R in this way to constitute an arrangement derived for making spaces occupied by the respective constituent parts as small as possible. The constituent parts may be arranged substantially in parallel in accordance with a shape of the light path R.

As shown in FIG. 14, by pertinently rotating the light amount control apparatus C in an arrow mark direction centering on an X—X axis as illustrated relative to the plane orthogonal to the light path R to attach to the main body of the projector-apparatus to incline a Y—Y axis as illustrated in a front and rear direction of an advancing direction of the optical path by an angle of θ, the light amount control apparatus C can be attached to the main body of the projector apparatus in a state of inclining the respective rotating shafts of the pair of rotating support shafts 70, 71 in the front and rear direction in the advancing direction of the optical path by the angle of θ. The pair of light amount control plates 20a, 20b of the light amount control apparatus C arranged at the main body of the projector apparatus shown in FIG. 2 can be opened in the biparting way in the state of being inclined in the front and rear direction in the advancing direction of the light path relative to the light source A by being supported in an inclined state.

By inclining the pair of light amount control plates 20a, 20b in the front and rear direction in the advancing direction of the light path, and by reflecting reflected light shielded and reflected by surfaces of the pair of light amount control plates 20a, 20b to outside of the light path R, the reflected light is not returned to a reflector of the light source A and does not repeat re-irradiation. As a result, a light amount speckle by repeating the irradiation is not brought about. There is not also brought about an operating speckle by causing a temperature rise by confining heat between the light source A and the light amount control apparatus C. Therefore, stable light amount control can be carried out.

Although the light amount speckle can be restrained sufficiently by constituting an inclination angle of the respective rotating shafts of the pair of rotating the support shafts 70, 71 in the front and rear direction in the advancing direction of the light path by 5 degrees to about 10 degrees, the inclination angle may pertinently be controlled by the optical system, a surface state of the light amount control plate, or a cooling structure in the apparatus. Further, in this case, in paper face of FIG. 14, left and right sides of the paper face inclined in an up and down direction of the light amount control apparatus C in the front and rear direction in the advancing direction of the light path may be inclined by being pivoted in the front and rear direction.

An explanation will be given of a transmitting mechanism for connecting the drive rotating shaft 33 and the rotating support shafts 70, 71 for pivotally supporting the light amount control plates 20a, 20b in reference to FIG. 10.

First, driving is transmitted to a drive gear 33a attached to the drive rotating shaft 33 constituting an output shaft of the drive motor 31. A toothed timing belt 34 for driving and connecting is hung between the drive gear 33a and a connecting gear 35a of a first gear assembly 35. A rotational drive force of the drive gear 33a transmitted to the toothed timing belt 34 is transmitted to the first gear assembly 35, and the first gear assembly 35 follows to rotate. Rotation of the first gear assembly 35 is further transmitted to a second gear assembly 36 brought in mesh with a spur gear 35b thereof, and the second gear assembly 36 is rotated in a state of being synchronized with rotation of the first gear assembly 35 in a direction reverse thereto. Further, both of the first gear assembly 35 and the second gear assembly 36 are rotatably supported by the frame 10.

The spur gear 35b constituting the first gear assembly 35 is attached with a folded arm 20c of the light amount control plate 20a such that the light amount control plate 20a is integrally pivoted with the spur gear 35b by a rotating shaft 35c, a positioning pin 35d, and an E ring 35e of the first gear assembly 35. A spur gear 36b constituting the second gear assembly 36 is attached with a folded arm 20d of the light amount control plate 20b such that the light amount control plate 20b is integrally pivoted with the spur gear 36b by a rotating shaft 36c, a positioning pin 36d, and an E ring 36e of the second gear assembly 36.

Therefore, the biparting opening can be carried out by rotating the light amount control plates 20a, 20b in directions reverse to each other respectively by a predetermined angle, in this case, 90° between the operating position at which the light amount control plates 20a, 20b advance into the light path R and the escaping position at which the light amount control plates 20a, 20b are escaped from the light path R as shown in FIG. 3(b) by rotating the first gear assembly 35 and the second gear assembly 36 in synchronism with each other via the timing belt 34 by pertinently rotating the drive motor 31 regularly and reversely.

As shown in FIG. 10, according to the transmitting member 40, the second gear assembly 36 brought in mesh with the single spur gear 35b of the first gear assembly 35 comprises two spur gears 36b, 36f pivotally supported on the same axis within a pertinent angle relative to each other. The two spur gears 36b, 36f are urged by a tension spring 36g in directions of pulling each other, and teeth of the spur gears are maintained in a positional relationship of being shifted from each other. Teeth of the spur gear 36b of the first gear assembly 35 are brought in mesh with between the shifted teeth of the two spur gears 36b, 36f of the second gear assembly 36. By always maintaining the contiguous tooth faces in a pressed state by the meshing, a backlash generally included in a gear connecting mechanism can be removed. Accordingly, positional accuracy of the light amount control plates is promoted, and the light amount is not dispersed.

As shown in FIG. 11, by attaching the light amount control plate 20a attached to the first gear assembly 35 and the light amount control plate 20b attached to the second gear assembly 36 to the first gear assembly 35 and the second gear assembly 36 respectively by the folded arms 20c, 20d, front ends 20e, 20f of shielding plate portions 20e, 20f of the light amount control plates 20a, 20b are rotated to draw rotational loci Xc, Xcc in accordance with an arm length (about 0.6 mm) of the folded arms 20c, 20d. By drawing the rotational loci in this way, an amount L for displacing the front ends 20e, 20f of the shielding plate portions 20e, 20f into the light path R is displaced substantially linearly at a rotational center of rotational angle 10° through 65° from the escaping position relative to a rotational angle α of rotating the front ends 20e, 20f of the shielding plate portions 20e, 20f of the light amount control plates 20a, 20b as shown in FIG. 12. The amount L for displaying into the light path R relative to the rotational angle α becomes 2.25 mm which is substantially constant. By controlling the rotational angle α by the drive motor 31, the light amount can easily be controlled. Further, FIG. 12 is a characteristic diagram when distances of the front ends 20e, 20f of the shielding plate portions 20e, 20f from the rotational center are about 1.2 mm, and the arm length of the folded arms 20c, 20d is about 0.6 mm from the rotational center.

Since the light amount control plates 20a, 20b are pivoted centering on the rotating support shafts 70, 71 in the arrow mark direction in FIGS. 3(a) and 3(b) (advancing direction of light path) to open and close in the biparting shape, as shown in FIG. 11, end portions 20g, 20h on sides opposed to the front ends 20e, 20f of the shielding plate portions 20e, 20f of the light amount control plates 20a, 20b are folded substantially orthogonally in directions to outside of the light path. By folding to bend the end portions, always, press rupture faces thereof are not directed to a side of the light source. A light amount speckle by random reflection of light incident on the press rupture face is not brought about, and control of the light amount is facilitated. Although, in this case, the end portions are folded to bend substantially in right angle, when the folded angle is substantially equal to or larger than right angle, the end portions 20g, 20h are not opposed to the light source A, and a similar effect can be achieved.

Therefore, at the contracting position at which the light amount control plates 20a, 20b are substantially orthogonal to the light path R, the light path R is contracted to a minimum aperture, and the passing light amount is minimized. At the escaping position at which the light amount control plates 20a, 20b are substantially in parallel with the advancing direction of the light path R, the light path R becomes a maximum aperture, and the passing light amount is maximized. The light amount of the light path R can pertinently be controlled by pivoting the light amount control plates 20a, 20b by the drive motor 31 in steps respectively within a range of 90 degrees.

Figure 6:
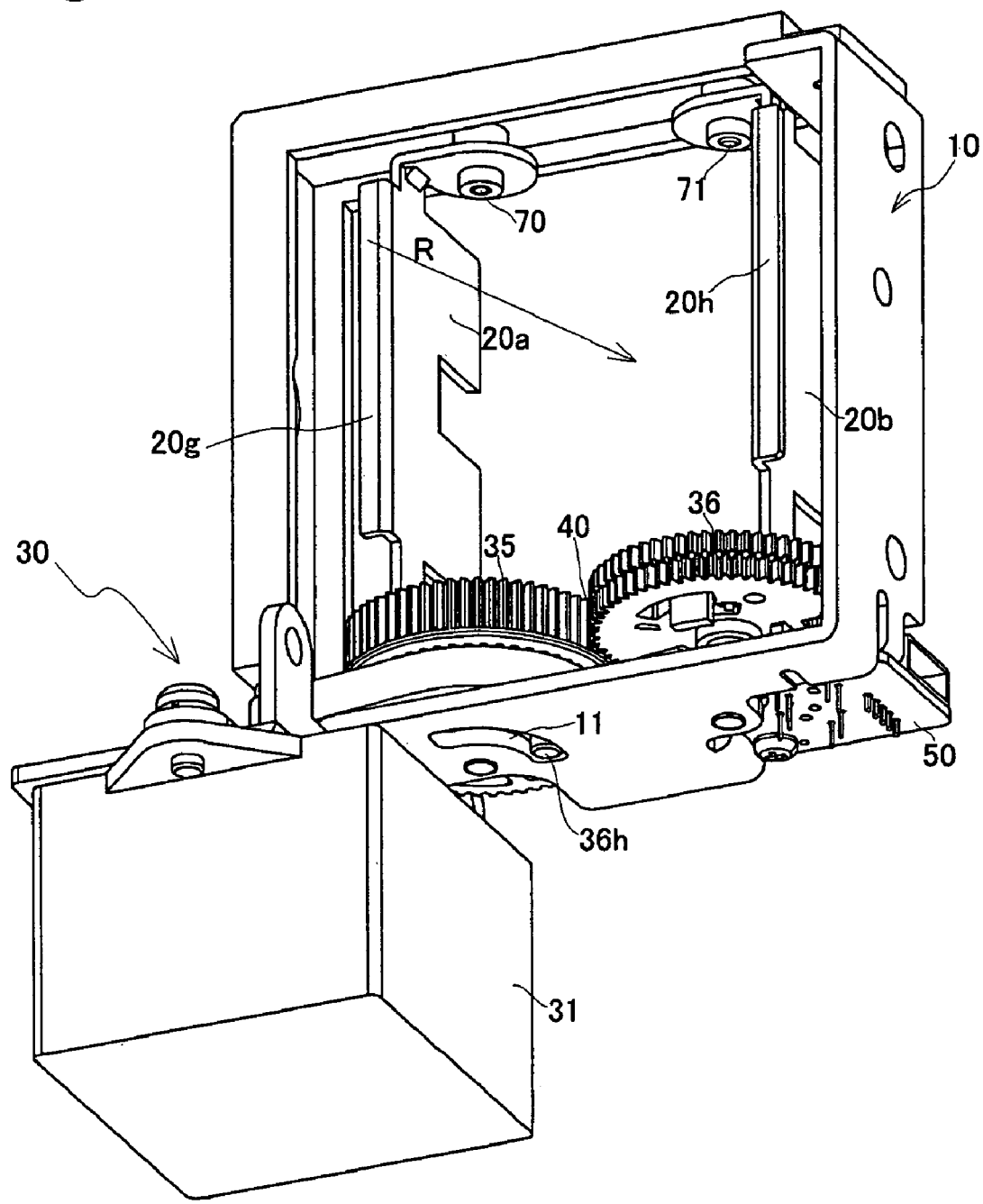
FIG. 6 is a perspective view of the apparatus shown in FIG. 4 viewed from below.

As shown in FIG. 6 and FIG. 9, a fan-shaped slit hole 11 is formed at a bottom portion of the frame 10, and the slit hole 11 is fitted with a restricting pin 35f extended to project downwardly from a lower face of the spur gear 36b of the gear assembly 35. A slit length of the slit hole 11 is set to constitute positions opened to outer sides from an interval between the operating position at which both of the light amount control plates 20a, 20b advance into the light path R shown in FIGS. 3(a) and 3(b) and the light path R becomes the minimum aperture, and the escaping position at which the light amount control plates 20a, 20b are escaped from the light path R and the light path R becomes the maximum aperture in a state in which the restricting pin 35f is brought into contact with both end portions of the slit more or less in consideration of part accuracy, error of part attaching position.

Therefore, at the escaping position at which the light amount control plates 20a, 20b escape from the light path R, the light amount control plates 20a, 20b can be restricted to be disposed firmly at outside of the light path. At the operating position at which the light amount control plates 20a, 20b advance into the light path R, the front end portions of the light amount control plates 20a, 20b can be restricted not to collide with each other. Particularly, collision at the operating position is prevented for restraining the shielding plate portions 20e, 20f from biting each other by interference when the shielding plate portions 20e, 20f of the light amount control plates 20a, 20b are rotated to draw the rotational loci in accordance with the arm length of the folded arms 20c, 20d.

Figure 7:
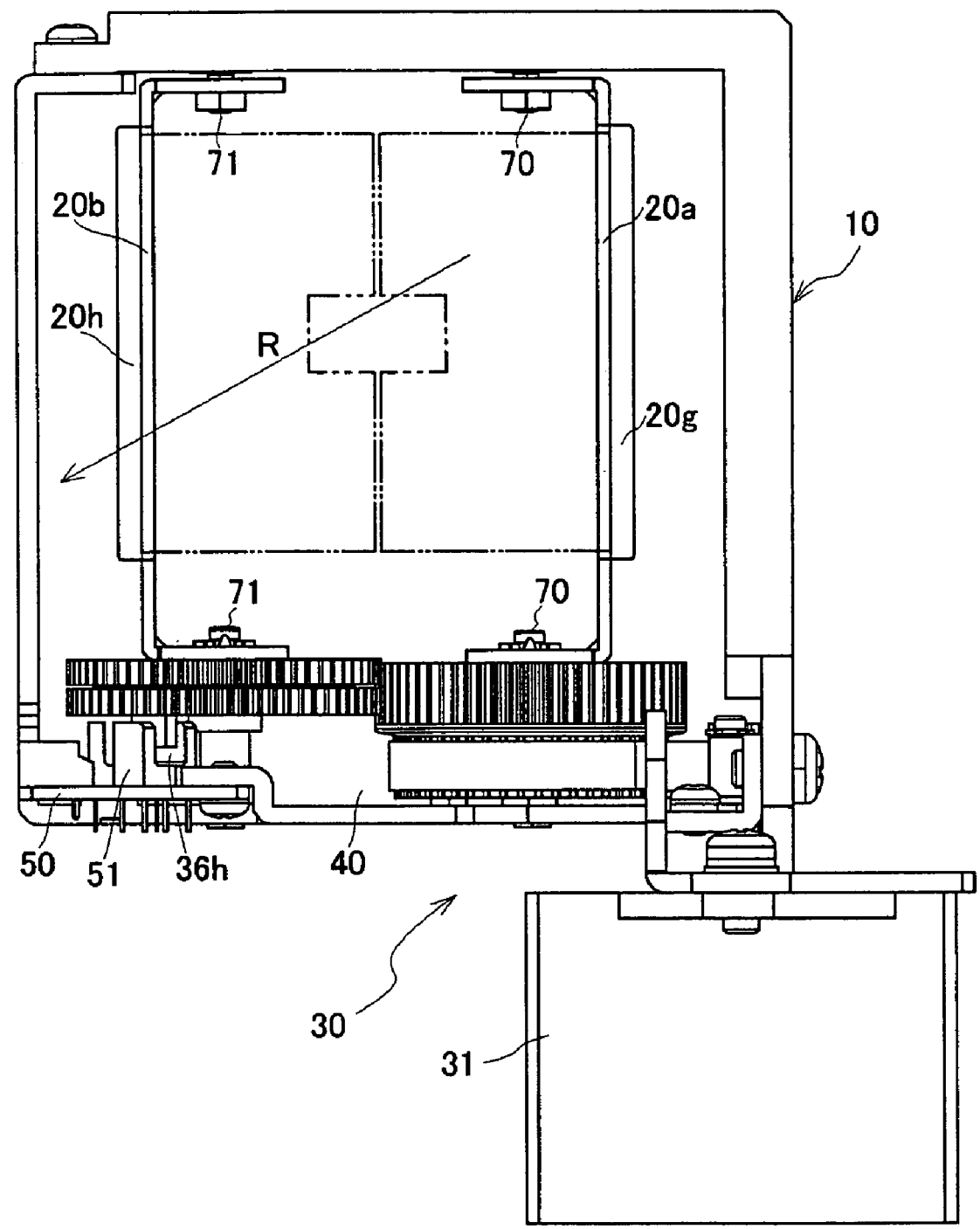
FIG. 7 is a rear view of the light amount control apparatus according to the invention.
Figure 8:
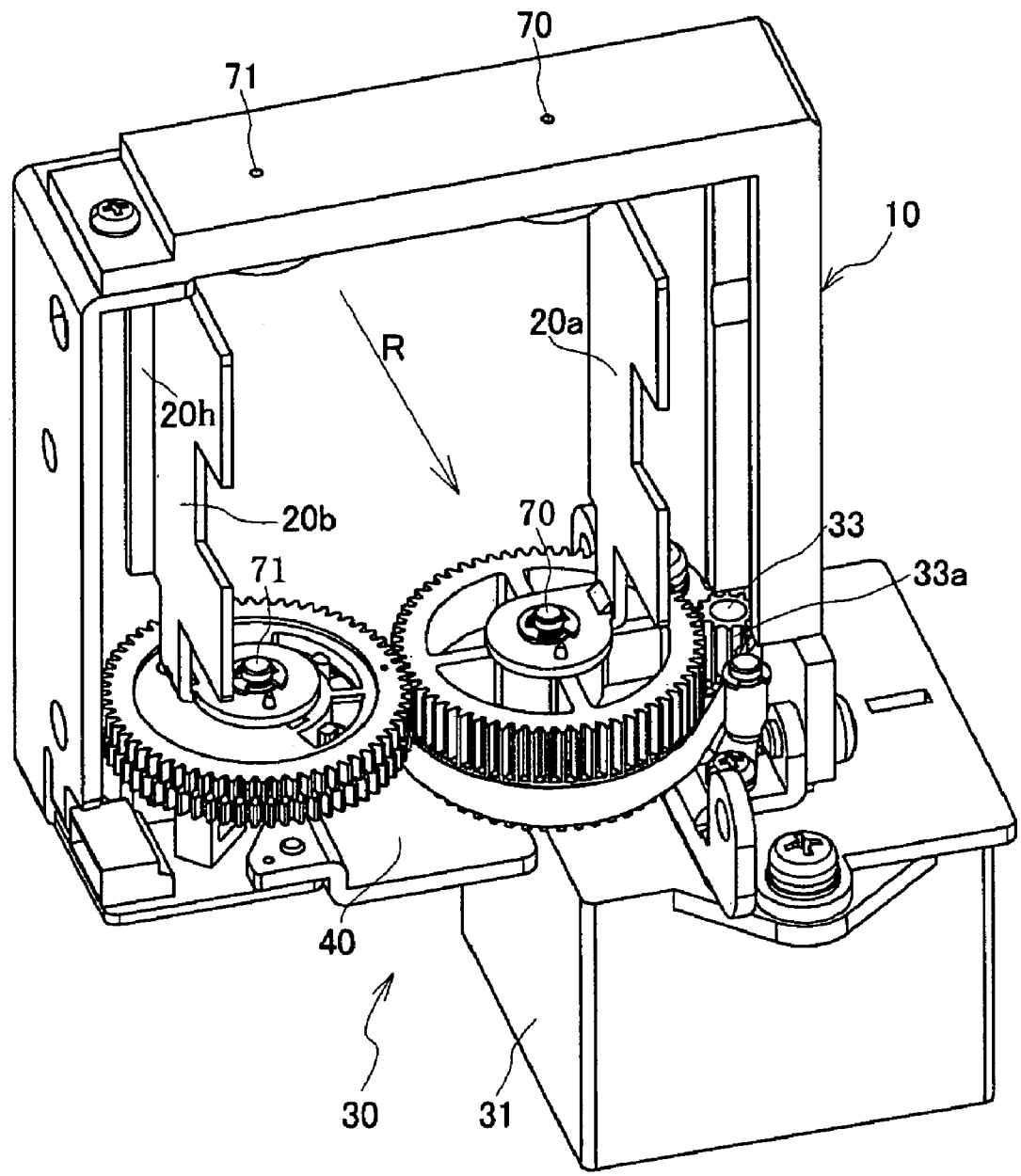
FIG. 8 is a perspective view of the apparatus shown in FIG. 7 viewed from above.

Next, control of the drive apparatus 30 will be explained. The drive apparatus 30 constituted by the stepping motor is electrically connected to a control board, not illustrated, integrated with a pulse generating circuit, a power source circuit and the like. Further, the second gear assembly 36 constituting the transmitting member 40 is provided with a position sensor lever 36h for detecting a rotational position thereof as shown in FIGS. 4, 7 and 9. Further, as shown in FIGS. 7 and 9, a position sensor 51 constituted by a photo-coupler attached to a detecting circuit board 50 is attached to the frame 10. When the light amount control plates 20a, 20b are disposed at the escaping position in FIG. 3(b), the position sensor lever 36h makes the position sensor 51 ON as a home position.

Figure 5:
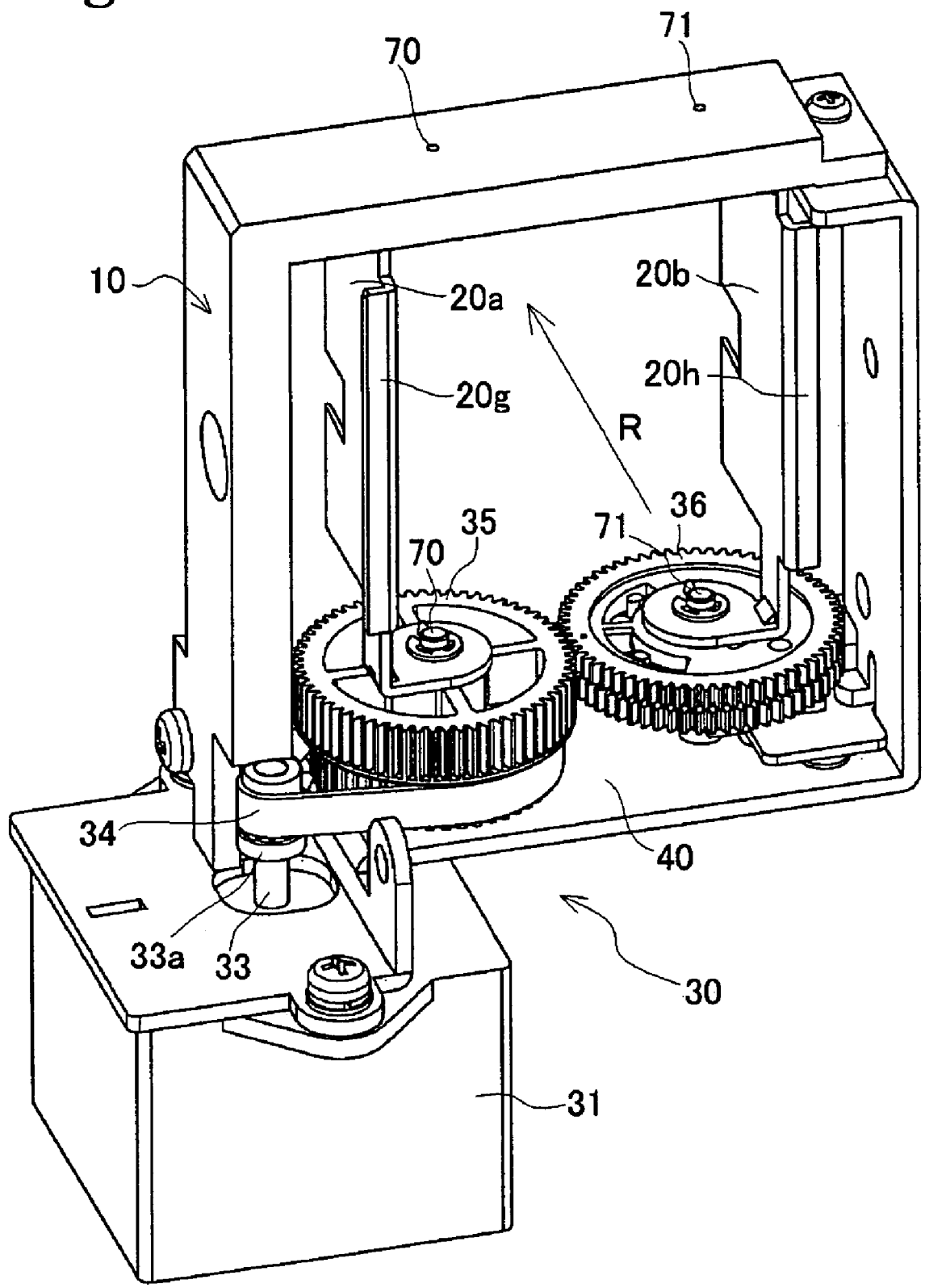
FIG. 5 is a perspective view of the apparatus shown in FIG. 4 viewed from above.

In a state of being disposed at the escaping position (FIG. 3(b)) in FIG. 4 through FIG. 6, the drive motor 31 rotates the drive gear 33a in the clockwise direction. The first gear assembly 35 is rotated via the timing belt 34 similarly in the clockwise direction, and the light amount control plate 20a is pivoted in a direction of the operating position (FIG. 3(a)) substantially orthogonal to the light path R. The second gear assembly 36 pinched to teeth of the spur gear 35b of the first gear assembly 35 by an urge force of the tension spring 36g is simultaneously rotated in the counterclockwise direction, and the light amount control plate 20b is pivoted in a direction of the operating position (FIG. 3(a)) substantially orthogonal to the light path R. By stopping the drive motor 31 at a pertinent position, the light amount control plates 20a, 20b are held at the stop position.

In holding the light amount control plates 20a, 20b at the stop position, postures thereof are maintained by detent torque of the drive motor 31 comprising the stepping motor or a load of a reduction gear.

Next, the drive motor 31 is rotated reversely, and the drive gear 33a is rotated in the counterclockwise direction. The first gear assembly 35 is similarly rotated in the counterclockwise direction via the timing belt 34, so that the light amount control plate 20a is pivoted in a direction of the escaping position (FIG. 3(b)) escaped from the light path R. The second gear assembly 36 pinched to teeth of the spur gear 35b of the first gear assembly 35 by the urge force of the tension spring 36g is simultaneously rotated in the clockwise direction, and the light amount control plate 20b is pivoted in a direction of the escaping position (FIG. 3(b)) escaped from the light path R. By stopping the drive motor 31 at a pertinent position, the light amount control plates 20a, 20b are held at the stop position. By stopping the drive motor 31 similarly at a pertinent position, the postures of the light amount control plates 20a, 20b are maintained at the stop position by the detent torque of the drive motor 30 or the load of the reduction gear.

Although the above-explained transmitting member 40 is constituted by a structure of bringing the first gear assembly 35 and the second gear assembly 36 into direct contact with each other, the transmitting member 40 may be constituted by a drive transmitting system using a timing belt or the like. Further, the first gear assembly 35 and the second gear assembly gear 36 may be constructed by a pertinent gear train in accordance with a speed reducing state.

Although there has been shown a case in which the pair of light amount control plates is arranged in the left and right direction or in the up and down direction of the light path R to open and close in the biparting state in the advancing direction of the light path R, the pairs of the light amount control plates may be formed in the left and right direction and the up and down direction, which will be explained in reference to FIGS. 13(a) to 13(c).

The light amount control plates 20a, 20b are provided at the positions opposed to each other on the left and right sides of the light path R, and light amount control plates 60a, 60b are provided at positions opposed to each other on the upper and lower sides of the light path R as illustrated. The light amount control plates 20a, 20b are pivotally supported by the rotating support shafts 70, 71 at the frame 10 similar to the above-described structure, and the light amount control plates 60a, 60b are also pivotally supported by the rotating support shafts 61, 62 similarly at the frame 10.

The upper and lower light amount control plates 60a, 60b are engaged with the left and right light amount control plates 20a, 20b at end portions thereof as shown in FIG. 13(a) to establish a relationship that when the left and right light amount control plates 20a and 20b are pivoted, the upper and lower light amount control plates 60a, 60b are pivoted in cooperation therewith.

Respective intervals between the upper and lower light amount control plates 60a, 60b and the rotating support shafts 61, 62 are provided with coil springs to urge to pivot in directions opposed to those designated by illustrated arrow marks. The left and right light amount control plates 20a, 20b are connected with the drive rotating shaft and the transmitting member having the above-described structure. Therefore, when the left and right light amount control plates 20a, 20b are opened and closed by a control similar to the above-described structure, the upper and lower light amount control plates 60a, 60b are opened and closed in cooperation therewith.

Next, the constitution of the projector apparatus will be explained as an outline layout constitution as shown in FIG. 2. The apparatus casing includes the light source A comprising a light source lamp of a halogen lamp or the like, and a reflector for randomly reflecting light of the light source. The light path R is formed by making light from the light source A in parallel by the condenser lens B. Light of the light path R is irradiated to the liquid crystal panel E via the focusing lens D. The liquid crystal panel is formed in three layers by filters of three primary colors of R, G, and B for forming an image by receiving an image signal. Therefore, the liquid crystal panel constitutes the image forming portion, and the image is projected from the projecting lens F onto the screen G by receiving light from the light source A. The projecting lens F is integrated with a focusing mechanism for focusing. The above-described light amount control apparatus is integrated to the light path R between the condenser lens B and the focusing lens D, and the light amount control plates 20a, 20b are arranged to open and close in the advancing direction of light.

The casing of the apparatus is provided with an illuminance sensor for detecting an exterior brightness. The illuminance sensor may be constituted by any of methods of detecting light constituted by reflecting light from the projecting lens by the screen G, detecting exterior light other than projected light from the projecting lens, or detecting a difference in brightness by detecting the above-described both of light. As the illuminance sensor, a position sensor for electrically detecting a light amount by using a photoelectric conversion element or a sensor of CCD may used.

A control portion of the projector apparatus is constituted with an image signal processing portion for transmitting an image signal to the liquid crystal panel by an IC chip or the like, and is connected to other image apparatus of an exterior computer or the like. The control portion is integrated with a controller and wired with an operation panel along with a focusing control, or a function of controlling the image. The brightness is constituted to be automatically controlled by operating a brightness control button provided at the operation panel or by a detecting signal from the illuminance sensor for detecting exterior light along therewith.

An operation will be explained next. A power source of the projector apparatus is switched on, and the image is projected onto the screen. A user operates the brightness control button of the control panel by looking at the image. Or, exterior light is detected by the illuminance sensor, and a previously set brightness control is executed. Or, both of exterior light and projected light reflected by the screen are detected by the illuminance sensor, and the brightness control is executed from a difference between light amounts thereof. When the control of the brightness on the screen is instructed by the controller, the light amount control apparatus executes the following operation.

First, the above-described drive apparatus 30 is in a state where the transmitting mechanism 40 stays at the home position. Although the home position is set to the escaping position as illustrated, the home position may be either of the contracting position or a middle point between the contracting position and the escaping position. The control circuit 50 receives a starting signal of a predetermined pulse number by receiving either signal of the manual control or the automatic control at the previous set home position, and a pulse power source is supplied to the drive motor 31. The drive motor is rotated by a predetermined angle by supplying the power source. Then, the drive gear 33a is rotated by a predetermined angle. The timing belt 34 brought in mesh therewith is driven, and the transmitting member 40 is pivoted by a predetermined amount. The pair of light amount control plates 20a, 20b is moved by a predetermined angle by pivoting the transmitting member 40. The light amount of the light path R is controlled to be large or small by moving the light amount control plates 20a, 20b by the predetermined angle, and the image projected to the screen is controlled to be bright or dark.

In such a procedure, according to the invention, the pair of light amount control plates 20a, 20b is supported by the rotating support shafts to pivot in the advancing direction of the light path at the side edge portions of the light path R for projecting light from the light source onto the screen to be opposed to each other. Accordingly, the light amount control plates in the blade-like shape hang a space which is moved to open and close, and moving loci are drawn as shown in FIGS. 3(a) and 3(b). In this case, the pair of light amount control plates. 20a, 20b is supported by the rotating support shafts 70, 71 arranged substantially in parallel with each other at the left and right side edges of the light path R. The drive rotating shaft 33 for rotating the pair of light amount control plates 20a, 20b by the predetermined angle is also arranged substantially in parallel with the support shafts 70, 71.

Therefore, the support shafts for supporting the pair of light amount control plates and the rotating shaft for driving the pair of light amount control plates are arranged substantially in parallel with each other at the left and right side portions of the light path R, and the apparatus is integrated by reducing a space of projecting in the side direction of the light path R. Further, the drive force of the drive rotating shaft 33 is transmitted to the rotating support shafts by the transmitting member arranged in a direction substantially orthogonal thereto. Accordingly, the transmitting member is contained at a peripheral edge portion of the light path R to downsize the apparatus.

The light amount control apparatus of the invention can be utilized in an optical apparatus for controlling a light amount other than the projector apparatus.

According to the invention, the amount of light passing the light path is controlled by pivoting the pair of light amount control plates arranged at the side edge portions of the projecting light path opposed to each other in the advancing direction of the light path. As compared with a case of moving the light amount control plates in the plane orthogonal to the light path, the light amount control apparatus is not projected to extrude in the side direction of the projecting light path, and the apparatus can be downsized.

According to the invention, the pair of light amount control plates is supported by the rotating support shafts arranged substantially in parallel with each other at the side edge portions of the light path opposed to each other. The drive rotating shaft is arranged substantially in parallel with the rotating support shafts. The transmitting member is arranged in the direction substantially orthogonal thereto. Accordingly, respective element parts constituting the light amount control apparatus can be arranged compactly at the peripheral edge of the light path, and the apparatus can be downsized. Particularly, the drive apparatus of the drive motor or the like is arranged in parallel with the direction the same as those of the rotating support shafts. Accordingly, the drive apparatus is not projected in the side direction of the light path. Since the pair of rotating support shafts is arranged substantially in parallel with each other and the transmitting member is provided in the direction substantially orthogonal thereto, in moving the transmitting member, the transmitting member can easily be realized to transmit to move by the same amount in synchronism with the pair of light amount control plates.

According to the invention, the mechanism of controlling the light amount of the projecting light path can be arranged to integrate to the peripheral edge of the light path. Accordingly, small-sized compact formation of the apparatus can be achieved, and the light amount control apparatus capable of accurately controlling the light amount and the projector apparatus using the same can be provided.

By respectively attaching one of the pair of light amount control plates at the first gear assembly, and by attaching the other thereof at the second gear assembly at the positions spaced apart from the rotational centers of the first gear assembly and the second gear assembly by the predetermined distances, the pair of light amount control plates is rotated centering on the rotational centers of the respective assemblies. The amount of displacing the front ends of shielding by the light amount control plates into the light path relative to the rotational angle α becomes substantially constant at a center of rotation. The control is facilitated by the drive motor, and the light amount control can pertinently be executed.

The pair of rotating support shafts is arranged substantially in parallel with each other. The transmitting member removing the backlash is provided in the direction substantially orthogonal thereto. Accordingly, in moving the transmitting member, the transmitting member can easily be realized to transmit to move by the same amount in synchronism with the pair of light amount control plates.

The light amount control apparatus is attached to the main body of the projector apparatus inclined to the direction orthogonal to the advancing direction of the projecting light path. Accordingly, even when the pair of light amount control plates is pivoted to the operating positions, the respective light amount control plates can always maintain the inclined state relative to the advancing direction of the light path. Most of light reflected by the surfaces of the respective light amount control plates is diverged to outside of the light path. The reflected light is not returned to the reflector of the light source A to repeat re-irradiation. As a result, there is not brought about the light amount speckle caused by repeating re-irradiation. There is not brought about the operating speckle by causing a temperature rise by containing heat between the light source A and the light amount control apparatus C, and the stable light amount control can be executed.

The disclosures of Japanese Patent Applications No. 2004-262691, filed on Sep. 9, 2004, No. 2004-262692, filed on Sep. 9, 2004, No. 2004-262693, filed on Sep. 9, 2004, and No. 2004-262694, filed on Sep. 9, 2004, are incorporated in the application.

While the invention has been explained with reference to the specific embodiments of the invention, the explanation is illustrative and the invention is limited only by the appended claims.

What is claimed is:

1. A light amount control apparatus comprising:
   at least one pair of light amount control plates facing each other and arranged at side edge portions of a light path of a light source;
   a pair of rotating support shafts arranged substantially parallel to each other for supporting the pair of light amount control plates so that the pair of the light amount control plates rotates relative to the light path;
   a driving device having a drive rotating shaft, said drive rotating shaft being arranged substantially parallel to the pair of the rotating support shafts; and
   a transmitting member for transmitting rotation of the drive rotating shaft to the pair of light amount control plates, said transmitting member including a first gear assembly arranged perpendicular to the drive rotating shaft and connected thereto to rotate in a first direction, and a second gear assembly associated with the first gear assembly and rotating in a second direction opposite to the first direction, said first gear assembly supporting one of the pair of light amount control plates and said second gear assembly supporting the other of the pair of light amount control plates;
   wherein said first gear assembly includes one first spur gear with first teeth, and said second gear assembly includes two second spur gears with second teeth rotatably supported on a same axis for meshing with the one first spur gear, said two second spur gears being urged in a direction that the two second spur gears are pulled each other in a rotational direction thereof, said second teeth being held at positions shifted from each other, said first teeth meshing with a portion between the second teeth.

2. A light amount control apparatus according to claim 1, wherein said first gear assembly is connected to the drive rotating shaft through a timing belt and rotates the second gear assembly so that the transmitting member transmits rotation in a direction substantially perpendicular to the pair of rotating support shafts so that the pair of light amount control plates rotates by a constant amount when the drive rotating shaft rotates the first gear assembly.

3. A light amount control apparatus according to claim 1, wherein said one of the pair of light amount control plates is attached to the first gear assembly and the other of the pair of light amount control plates is attached to the second gear assembly at positions away from rotational centers of the first gear assembly and the second gear assembly by predetermined distances so that the pair of light amount control plates rotates by a predetermined angle between an operating position where the pair of light amount control plates advances into the light path and an escaping position where the pair of light amount control plates is escaped from the light path.

4. A light amount control apparatus comprising:
   at least one pair of light amount control plates facing each other and arranged at side edge portions of a light path of a light source;
   a pair of rotating support shafts arranged substantially parallel to each other for supporting the pair of light amount control plates so that the pair of the light amount control plates rotates relative to the light path;
   a driving device having a drive rotating shaft, said drive rotating shaft being arranged substantially parallel to the pair of the rotating support shafts; and
   a transmitting member for transmitting rotation of the drive rotating shaft to the pair of light amount control plates, said transmitting member including a first gear assembly arranged perpendicular to the drive rotating shaft and connected thereto to rotate in a first direction, and a second gear assembly associated with the first gear assembly and rotating in a second direction opposite to the first direction, said first gear assembly supporting one of the pair of light amount control plates and said second gear assembly supporting the other of the pair of light amount control plates;
   wherein said pair of light amount control plates includes two pairs of light amount control plates facing each other provided at the left and right side edge portions and upper and lower side edge portions of the light path, said two pairs of light amount of control plates being rotationally supported by rotating support shafts relative to the light path.

5. A light amount control apparatus comprising:
   at least one pair of light amount control plates facing each other and arranged at side edge portions of a light path of a light source;
   a pair of rotating support shafts arranged substantially parallel to each other for supporting the pair of light amount control plates so that the pair of the light amount control plates rotates relative to the light path;
   a driving device having a drive rotating shaft, said drive rotating shaft being arranged substantially parallel to the pair of the rotating support shafts; and
   a transmitting member for transmitting rotation of the drive rotating shaft to the pair of light amount control plates, said transmitting member including a first gear assembly arranged perpendicular to the drive rotating shaft and connected thereto to rotate in a first direction, and a second gear assembly associated with the first gear assembly and rotating in a second direction opposite to the first direction, said first gear assembly supporting one of the pair of light amount control plates and said second gear assembly supporting the other of the pair of light amount control plates;

wherein said first gear assembly includes one first spur gear with first teeth connected to the drive rotating shaft, and said second gear assembly includes a pair of second spur gears with second teeth rotatably supported on a same axis, said pair of second spur gears being urged in a direction that the pair of the second spur gears is pulled each other in a rotational direction thereof, said second teeth being held at positions shifted from each other, said first teeth meshing with a portion between the second teeth.

6. A light amount control apparatus according to claim 5, further comprising an urging device interposed between the pair of second spur gears for urging the same in the direction that the pair of second spur gears is pulled each other.

7. A light amount control apparatus according to claim 6, wherein said urging device includes a tension spring interposed between the pair of second spur gears.

8. A light amount control apparatus comprising:
at least one pair of light amount control plates facing each other and arranged at side edge portions of a light path of a light source;
a pair of rotating support shafts arranged substantially parallel to each other for supporting the pair of light amount control plates so that the pair of the light amount control plates rotates relative to the light path;
a driving device having a drive rotating shaft, said drive rotating shaft being arranged substantially parallel to the pair of the rotating support shafts; and
a transmitting member for transmitting rotation of the drive rotating shaft to the pair of light amount control plates, said transmitting member including a first gear assembly arranged perpendicular to the drive rotating shaft and connected thereto to rotate in a first direction, and a second gear assembly associated with the first gear assembly and rotating in a second direction opposite to the first direction, said first gear assembly supporting one of the pair of light amount control plates and said second gear assembly supporting the other of the pair of light amount control plates;
wherein said pair of light amount control plates includes side ends situated adjacent to the light path and rotating around the pair of rotating support shafts when the pair of light amount control plates is situated at an escaping position where the pair of the light amount control plates is escaped from the light path, said side edges being bent outwardly relative to a center of the light path at an angle equal to a substantially right angle or greater.

9. A projector apparatus comprising:
an image forming device for forming an image;
a projecting light path for projecting light from a light source to the image forming device;
a pair of light amount control plates facing each other and arranged at side edge portions of the projecting light path;
a pair of rotating support shafts arranged at the side edge portions of the light path substantially parallel to each other for supporting the pair of light amount control plates so that the pair of light amount control plates rotates relative to the light path;
a driving device having a drive rotating shaft for rotating the pair of light amount control plates to open and close, said drive rotating shaft being arranged substantially parallel to the rotating support shafts; and
a transmitting member including a first gear assembly arranged perpendicular to the drive rotating shaft and connected to the drive rotating shaft to rotate in a first direction, and a second gear assembly associated with the first gear assembly and rotating in a second direction opposite to the first direction, said first gear assembly supporting one of the pair of light amount control plates and said second gear assembly supporting the other of the pair of light amount control plates;
wherein said first gear assembly includes one first spur gear with first teeth connected to the drive rotating shaft, and said second gear assembly includes a pair of second spur gears with second teeth rotatably supported on a same axis, said pair of second spur gears being urged in a direction that the pair of second spur gears is pulled each other in a rotational direction thereof, said second teeth being held at positions shifted from each other, said first teeth meshing with a portion between the second teeth.

10. A projector apparatus comprising:
an image forming device for forming an image;
a projecting light path for projecting light from a light source to the image forming device;
a pair of light amount control plates facing each other and arranged at side edge portions of the projecting light path;
a pair of rotating support shafts arranged at the side edge portions of the light path substantially parallel to each other for supporting the pair of light amount control plates so that the pair of light amount control plates rotates relative to the light path;
a driving device having a drive rotating shaft for rotating the pair of light amount control plates to open and close, said drive rotating shaft being arranged substantially parallel to the rotating support shafts; and
a transmitting member including a first gear assembly arranged perpendicular to the drive rotating shaft and connected to the drive rotating shaft to rotate in a first direction, and a second gear assembly associated with the first gear assembly and rotating in a second direction opposite to the first direction, said first gear assembly supporting one of the pair of light amount control plates and said second gear assembly supporting the other of the pair of light amount control plates;
wherein said pair of light amount control plates includes side ends situated adjacent to the projecting light path and rotating around the pair of rotating support shafts when the pair of light amount control plates is situated at an escaping position where the pair of light amount control plates is escaped from the projecting light path, said side edges being bent outwardly relative to a center of the projecting light path at an angle equal to a substantially right angle or greater.

11. A projector apparatus according to claim 9, wherein said pair of light amount control plates is arranged to be inclined relative to the projecting light path.

12. A projector apparatus according to claim 11, wherein said pair of light amount control plates rotates by a predetermined angle between an operating position where the pair of light amount control plates advances into the projecting light path and an escaping position where the pair of light amount control plates is escaped from the projecting light path.

* * * * *